Dec. 30, 1952     R. WIESSNER     2,623,375

FRICTION WHEEL TYPE LIGHTER

Filed Dec. 6, 1949

INVENTOR:
ROBERT WIESSNER, DECEASED
BY HEINZ WIESSNER, EXECUTOR

By Richardson, David and Nordon
             Att'ys

UNITED STATES PATENT OFFICE 2,623,375

FRICTION WHEEL TYPE LIGHTER

Robert Wiessner, deceased, late of Vienna, Austria, by Heinz Wiessner, administrator, Vienna, Austria Application December 6, 1949, Serial No. 131,458
In Austria December 7, 1948

5 Claims. (Cl. 67—7.1)

This invention relates to a lighter which comprises a friction wheel and in which the friction wheel carrier is removably attached to the lighter body, against which the flint spring bears with its end opposite to the friction wheel.

The invention consists primarily in providing a lighter which comprises a friction wheel, with a friction wheel carrier which is removably mounted to the lighter body by means of a pillow bearing which is open toward the friction wheel, the friction wheel carrier being held in position for use by the pressure exercised on the friction wheel by the flint spring.

Figure 1:
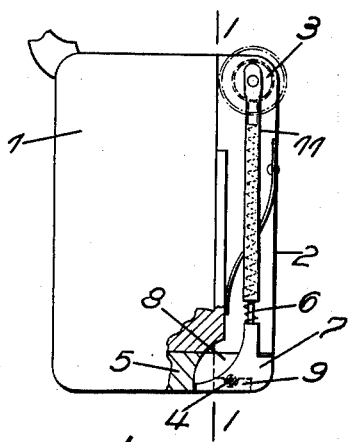
Figure 2:
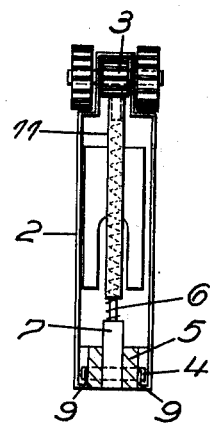
Figure 3:
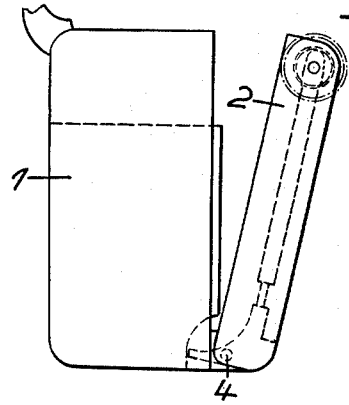

An embodiment of the invention is shown, by way of example, in the drawing, in which, Fig. 1 is a side view showing the lighter in position for use, the friction wheel carrier being shown as a longitudinal section;

Fig. 2 a cross section taken along the line I—I in Fig. 1;

Fig. 3 a view of the lighter with swung-out friction wheel carrier; and

Figure 4:
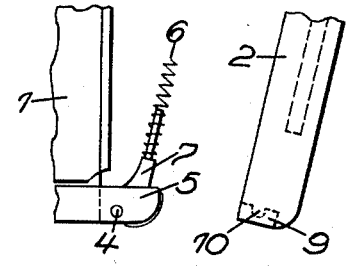

Fig. 4 a partial view of the lighter body with the friction wheel carrier removed.

To one of the narrow sides of the lighter body 1, which contains the fuel tank, the friction wheel carrier 2 is attached so as to be capable of being swung out of the body. The friction wheel carrier consists of a sheet metal rail of U-shaped cross section, which carries at its top end the friction wheel 3 and is linked with its bottom end to the lighter body 1 by means of a pillow bearing which is open on one side. This connection is effected by means of a pivot pin 4, which is fixed to a bearing block 5, which forms the bottom of the lighter body 1 and stands off from the narrow side of the lighter body 1 facing the friction wheel carrier. The bottom end of the flint spring 6 bears against a lamination-type bracket 7, which is fitted into a slot 8 of the bearing block 5 so as to be swingable about the pin 4. In order to close the slot 8 toward the outside at least when the lighter is in position for use, the outer edge of the bracket 7 is designed to conform with the contour of the parts 5 and 2 surrounding it. At the insides of the two flanges of the friction wheel carrier 2, the bearing pillows 9 are provided, e. g., by the ends of the flanges being turned inward and each end being provided with a semicircular, open, cutting-out 10 for engaging with the two journals of the pivot pin 4.

The connection of the friction wheel carrier 2 with the lighter body 1 is maintained by the flint spring 6. The pressure of this spring against the friction wheel 3 has the effect of pulling the friction wheel carrier 2 upward, the bearing pillows 9 being pressed against the journals of the pin 4. This articulation is maintained even when the friction wheel carrier 2 is swung out (Fig. 3). Only when the force of the spring 6 is overcome by the friction wheel carrier 2 being pressed downward, the journals of the pin 4 disengage from the bearing pillows 9, whereby the articulation is interrupted so that the friction wheel carrier may be detached laterally from the bearing block 5 (Fig. 4). When subsequently the friction wheel carrier 2 with the flint sleeve 11 is pulled off entirely from the spring 6, a new flint may be inserted. The length of the pivot pin 4 is such as not to extend through the flanges of the friction wheel carrier but being covered by them. In lighters comprising igniting means which may be swung out, this feature of the invention results in the advantage that the articulation is not visible from the outside. The special design of the articulation permits of the insertion of the flint without requiring the use of a tool, or of a screw or another fixing part which is easily lost.

What I claim is:

1. A lighter which comprises a lighter body, a removable friction wheel carrier having fixed thereto a friction wheel and a flint tube, a bracket, a pivot pin pivotally connecting said bracket to the lighter body, a flint spring inserted in the flint tube and having two ends one of which bears against said bracket, a flint interposed in said flint tube between the other end of said spring and said friction wheel, and pillow bearings provided in said friction wheel carrier at the lower end thereof, said bearings being open toward the friction wheel and in engagement with said pivot pin and urged against the latter by the force of the flint spring acting on the friction wheel carrier through the flint and friction wheel.

2. A lighter which comprises a lighter body, a removable friction wheel carrier consisting of a channel section rail having two flanges, said friction wheel carrier having fixed thereto a flint tube and adjacent to one of its ends a friction wheel, a bracket, a pivot pin pivotally connecting said bracket to the lighter body, a flint spring inserted in the flint tube and having two ends one of which bears against said bracket, a flint interposed in said flint tube between the other end of said spring and said friction wheel, and pillow bearings provided at the inside of said flanges at the end of said friction wheel carrier opposite the friction wheel, said bearings being open toward the friction wheel and in engagement with said pivot pin and urged against the latter by the force of the flint spring acting on the friction wheel carrier through the flint and friction wheel.

3. A lighter which comprises a lighter body, a removable friction wheel carrier consisting of a channel section rail having two flanges, said friction wheel carrier having fixed thereto a flint tube and adjacent to one of its ends a friction wheel, a bracket, a pivot pin pivotally connecting said bracket to the lighter body, a flint spring inserted in the flint tube and having two ends one of which bears against said bracket, a flint interposed in said flint tube between the other end of said spring and said friction wheel, each of said flanges having an inwardly bent portion opposite to the friction wheel end of the friction wheel carrier, and a cutting-out provided in the edge of each of said bent portions, said cuttings-out being open toward the friction wheel and in engagement with said pivot pin and urged against the latter by the force of the flint spring acting on the friction wheel carrier through the flint and friction wheel.

4. A lighter which comprises a lighter body, a removable friction wheel carrier of channel section, having two flanges, said friction wheel carrier being fitted adjacent to one side of the lighter body and having fixed to it a flint tube and adjacent to one of its ends a friction wheel, a bearing block constituting the bottom of the lighter body and standing off from that side of the lighter body adjacent to which the friction wheel carrier is fitted, a flint spring bracket having a pivot pin pivotally connected to the lighter body, said pivot pin being shorter than the inside distance between said flanges, said flanges covering the ends of said pivot pin, a flint spring inserted in the flint tube and having two ends one of which bears against said bracket, a flint interposed in said flint tube between the other end of said spring and said friction wheel, and pillow bearings provided in said friction wheel carrier at the lower end thereof, said bearings being open toward the friction wheel and in engagement with said pivot pin and urged against the latter by the force of the flint spring acting on the friction wheel carrier through the flint and friction wheel.

5. A lighter which comprises a lighter body, a removable friction wheel carrier of channel section, having two flanges, said friction wheel carrier being fitted adjacent to one side of the lighter body and having fixed to it a flint tube and a friction wheel, a bearing block constituting the bottom of the lighter body and standing off from that side of the lighter body adjacent to which the friction wheel carrier is fitted, a flint spring bracket having a pivot pin pivotally connected to the lighter body, said pivot pin being shorter than the inside distance between said flanges, said flanges covering the ends of said pivot pin, a flint spring inserted in the flint tube and having two ends one of which bears against said bracket, a flint interposed in said flint tube between the other end of said spring and said friction wheel, pillow bearings provided in said friction wheel carrier at the lower end thereof, said bearings being open toward the friction wheel and in engagement with said pivot pin and urged against the latter by the force of the spring acting on the friction wheel carrier through the flint and friction wheel, said bearing block having a slot, and said bracket having a portion fitted in said slot and designed for conformity with the contours of said bearing block to close the slot toward the outside in position for use.

HEINZ WIESSNER,
*Administrator and Executor of the Estate of Robert Wiessner, Deceased.*

REFERENCES CITED

The following references are of record in the file of this patent:

UNITED STATES PATENTS

| Number | Name | Date |
|---|---|---|
| 2,219,531 | Racek | Oct. 29, 1940 |
| 2,526,860 | Garber | Oct. 24, 1950 |

FOREIGN PATENTS

| Number | Country | Date |
|---|---|---|
| 700,299 | Germany | Dec. 17, 1940 |